United States Patent [19]
Lynch

[11] Patent Number: 6,122,266
[45] Date of Patent: *Sep. 19, 2000

[54] MULTI-LEVEL SECTORIZED CDMA COMMUNICATIONS

[75] Inventor: Michael A. Lynch, Landing, N.J.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/801,338

[22] Filed: Feb. 19, 1997

[51] Int. Cl.$^7$ .............................. H04B 7/216; H04Q 7/20
[52] U.S. Cl. ............................................. 370/335; 455/446
[58] Field of Search ...................... 370/335, 342, 370/320, 324, 331, 329, 441, 334; 375/200; 455/434, 446, 447, 449, 450, 515, 562, 436, 442, 444; 342/381

[56] References Cited

U.S. PATENT DOCUMENTS

| | | | |
|---|---|---|---|
| 4,144,411 | 3/1979 | Frenkiel | 455/447 |
| 5,038,399 | 8/1991 | Bruckert | 455/447 |
| 5,093,925 | 3/1992 | Chanroo | 455/447 |
| 5,355,367 | 10/1994 | Comroe et al. | 455/447 |
| 5,504,936 | 4/1996 | Lee | 455/54.1 |
| 5,511,067 | 4/1996 | Miller | 370/342 |
| 5,596,333 | 1/1997 | Bruckert | 455/277.1 |
| 5,596,570 | 1/1997 | Soliman | 370/335 |
| 5,625,876 | 4/1997 | Gilhousen et al. | 455/277.1 |
| 5,649,292 | 7/1997 | Doner | 455/477 |
| 5,678,187 | 10/1997 | Meidan et al. | 455/62 |
| 5,680,395 | 10/1997 | Weaver, Jr. et al. | 370/335 |
| 5,805,575 | 9/1998 | Kamin, Jr. | 370/335 |
| 5,825,762 | 10/1998 | Kamin | 370/355 |

FOREIGN PATENT DOCUMENTS

| | | |
|---|---|---|
| WO 94/28690 | 12/1994 | WIPO . |
| WO 95/22210 | 8/1995 | WIPO . |
| WO 96/00466 | 1/1996 | WIPO . |

OTHER PUBLICATIONS

An Introduction of GSM, 1995.

*Primary Examiner*—Chi H. Pham
*Assistant Examiner*—Steven Nguyen
*Attorney, Agent, or Firm*—Steve Mendelsohn

[57] ABSTRACT

A base station of a code division multiple access (CDMA)-based communications network (e.g., one conforming to the IS-95 standard) is sectorized such that, a first subset of CDMA channels are communicated using a first level of cell-site sectorization and a second subset of CDMA channels, different from the first subset, are communicated using a second level of cell-site sectorization, different from the first level. For example, the first set of CDMA channels may be the pilot and sync channels and the second subset of CDMA channels may be the access, paging, and traffic channels. In one set of implementations, at the first sectorization level, each cell site is omnidirectional (for the first subset of CDMA channels), while, at the second sectorization level, each cell site is divided into two or more sectors (for the second subset of CDMA channels). In this set of implementations, each cell site is assigned one pseudo noise (PN) offset and transmits one pilot channel. In another set of implementations, at the first sectorization level, each cell site is divided into two or more sectors (for the first subset of CDMA channels), while, at the second sectorization level, each sector is further divided into two or more sub-sectors (for the second subset of CDMA channels). In this set of implementations, each sector is assigned one PN offset and each cell site transmits a different pilot channel for each sector. In either case, the present invention is able to provide certain advantages of sectorization (e.g., increased capacity and reduced interference) while reducing certain disadvantages of sectorization (e.g., pilot pollution, handoff processing). Moreover, the present invention can be implemented to support existing remote terminals (e.g., mobile/cellular telephones) having three-finger RAKE receivers.

30 Claims, 3 Drawing Sheets

MULTI-LEVEL SECTORIZED CDMA COMMUNICATIONS

BACKGROUND OF THE INVENTION

1. Field of the Invention

The present invention relates to communications, and, in particular, to code division multiple access (CDMA) communications systems.

2. Description of the Related Art

Figure 1A:
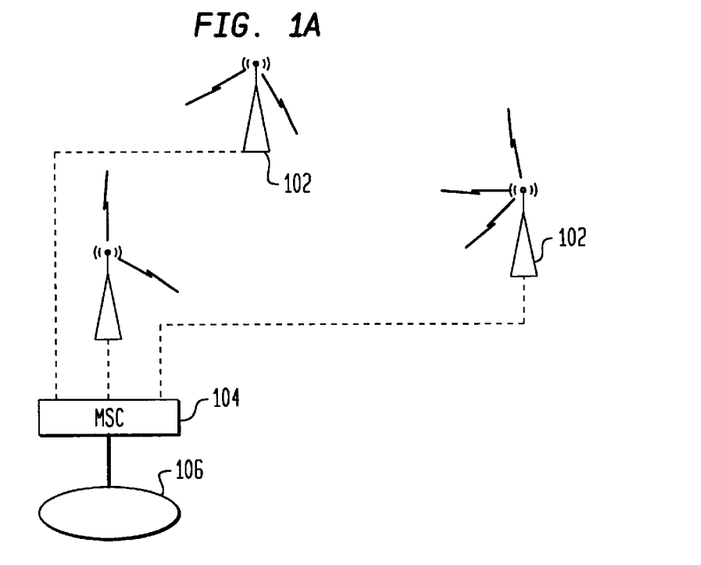
FIG. 1a shows a representation of a telecommunications network comprising base stations, a mobile switching center, and a relay node.

FIG. 1a shows a representation of a telecommunications network comprising base stations 102, mobile switching center (MSC) 104, and relay node 106. Network 100 is designed to support communications to and from remote terminals that are located within the coverage area of base stations 102. For example, if the remote terminals are mobile/cellular telephones then the network supports telephone communications to and from mobile phone users located within the network.

In operation, each remote terminal transmits telecommunications signals to and/or receives telecommunications signals from (at least) one base station 102. Each base station 102 transmits signals received from the remote terminals within its coverage area to MSC 104. MSC 104 identifies the appropriate destinations for the signals received from its remote terminals and distributes those signals accordingly (e.g., to a base station 102 or to relay node 106). Relay node 106 may be connected via hard-wire or air-link to other relay nodes and/or other types of communications networks. Similarly, relay node 106 receives signals from other communications networks for distribution to MSC 104. MSC 104 transmits signals back to base stations 102 for broadcast and receipt by the appropriate remote terminals. In this way, the network of FIG. 1a supports telecommunications to and from remote terminals within the coverage area of base stations 102.

Base stations 102 are preferably distributed to provide seamless coverage. In other words, base stations 102 are located such that, at any location within the total coverage range of the network, a remote terminal will be able to communicate with (at least) one base station 102.

Figure 1B:
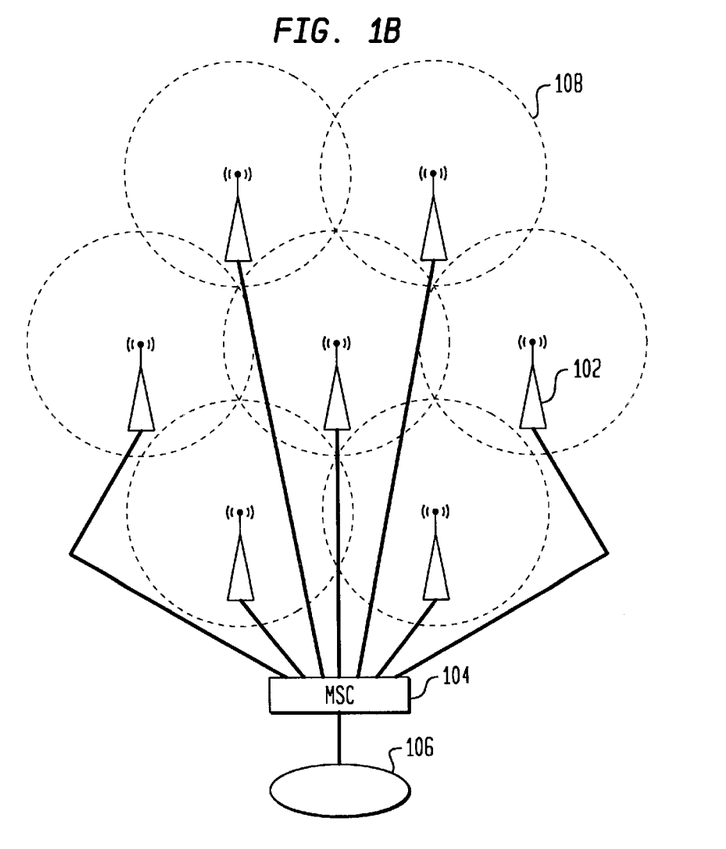
FIG. 1b shows a representation of an idealized (e.g., perfectly flat) communications network, having base stations distributed in such a manner as to provide seamless coverage over the entire network range.

FIG. 1b shows a representation of an idealized (e.g., perfectly flat) communications network 100, having base stations 102 distributed in such a manner as to provide seamless coverage over the entire network range. The effective range of each base station 102 in network 100 is depicted as a circle in FIG. 1b and is referred to as a cell site 108. In reality, cell sites may be more accurately considered to be three-dimensional (e.g., spherical or semi-spherical) in shape. The union of all of the cell sites 108 forms the total coverage area for network 100.

In FIG. 1b, base stations 102 are distributed such that the cell sites of adjacent base stations overlap and there are no locations within the interior of the network that are not covered by at least one base station. As shown in FIG. 1b, some locations (i.e., those within the intersections of two adjacent cell sites) may be able to communicate with two different base stations, while other locations (i.e., those within the intersections of three adjacent cell sites) may be able to communicate with three different base stations.

Figure 2:
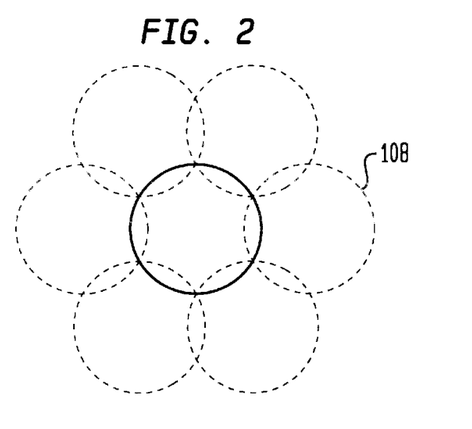
FIG. 2 shows the coverage pattern for the telecommunications network of FIG. 1b.

FIG. 2 shows the coverage pattern for telecommunications network 100 of FIG. 1b. Each circle in FIG. 2 corresponds to the cell site 108 of a different base station 102 in network 100. In FIG. 2, each base station 102 transmits and receives signals in an omnidirectional pattern. That is, each base station 102 transmits its signals uniformly in all directions (i.e., 360 degrees when viewing each cell site as a circle).

One communications scheme for use in networks such as telecommunications network 100 of FIG. 1b is the IS-95 standard, which is based on code division multiple access (CDMA) modulation. According to the IS-95 standard for CDMA systems, each base station 102 of FIG. 1b is assigned a different pseudo noise (PN) offset (or, at least, adjacent base stations are assigned different PN offsets). In this way, each base station 102 can support up to 64 different code channels, with each code channel being assigned one of 64 different orthogonal Walsh code (i.e., CDMA) sequences.

Under the IS-95 standard, there are five different types of code channels that can be used to communicate between a base station 102 and each remote terminal: pilot, sync, paging, access, and traffic. The forward link (from base station to remote terminal) has the following four types of channels:

Pilot—transmitted at a high power level and providing a reference for decoding sync, paging, and forward link traffic channels;

Sync—providing timing information to the remote terminal:

Paging—providing cell site information to the remote terminal; and

Traffic—providing power control data and voice data to the remote terminal.

The reverse link (from remote terminal to base station) has the following two types of channels:

Access—providing a means for a remote terminal to initiate a call or respond to a page; and Traffic—providing a means for the remote terminal to send power control data and voice data to the base station.

Under the IS-95 standard, for each base station, the forward link has one pilot channel (typically assigned Walsh code sequence 0), one sync channel (typically assigned Walsh code sequence 32), and (in theory) up to 62 different paging and traffic channels (each assigned one of the 62 remaining Walsh code sequences). Similarly, the reverse link has one or more access channels and one traffic channel for every traffic channel in the forward link (i.e., up to 62). Instead of using Walsh codes for the reverse link, each traffic channel is identified by a distinct user long code sequence and each access channel is identified by a distinct access channel long code sequence.

In practice, however, the number of traffic channels (and therefore the number of remote terminals) that can be simultaneously supported by any one base station 102 of FIG. 1b is limited to much less than 62. Despite the mathematical orthogonality between channels that are assigned different Walsh code sequences, interference will still occur between those channels. This interference increases as more channels are assigned until the level of interference adversely affects the integrity of the communications. Depending upon the circumstances, this interference can limit the number of remote terminals capable of being supported at one time by a single base station to as low as about 10.

One conventional technique for increasing base station capacity (as well as coverage area) relies on sectorization. In sectorization, omni-directional cell sites are each divided into multiple sectors to achieve the desired capacity and coverage. Sectorization provides a way to divide the total number of users (One user per traffic channel) into smaller groups. Assume, for example, that all users are evenly distributed by location around a base station. A sectorized antenna system uses directional antennas to divide the cell site like slices of a pie.

Figure 3:
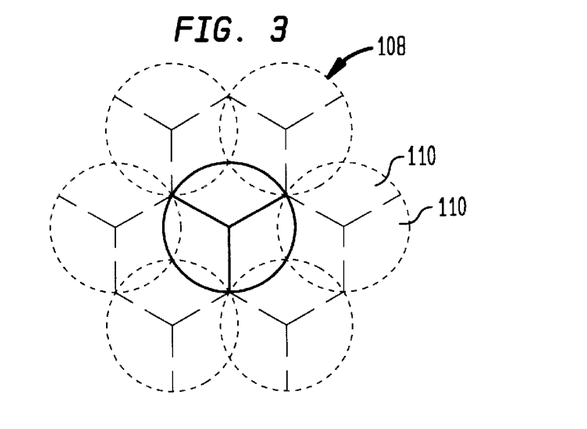
FIG. 3 shows a representation of a sectorization scheme for the telecommunications network of FIG. 1b, in which each cell site is sectorized into three equal sectors.

FIG. 3 shows a representation of a sectorization scheme for telecommunications network 100 of FIG. 1b, in which each cell site is sectorized into three equal sectors 110. In other sectorization schemes, each cell site may be divided into a different number of sectors. In general, however, each sector within a given cell site is assigned a different PN offset. Because each sector is assigned its own PN offset, each sector has its own pilot channel. Thus, in FIG. 3, each cell site 108 transmits three different pilot channels, one for each sector 110. Since each sector of a given cell site has its own PN offset, each sector is capable of supporting 64 different code channels. As a result, the sectorization scheme of FIG. 3 theoretically triples the number of remote terminals that can be supported by a single base station.

For CDMA systems, like network 100 of FIG. 1b, however, the benefits of sectorization are limited. Some of these limitations relate to cell site capacity, pilot pollution, and hand-off processing.

As to cell site capacity, interference between code channels effectively limits the number of useable code channels. Ideally, the amount of interference in each sector is reduced since it is based on the subset of users in its geographic slice. In practice, however, the interference reduction is based primarily on the antenna directivity (or pattern), overlap of sector boundaries, and the uneven distribution of mobile terminals in the cell site.

As to pilot pollution, a conventional CDMA remote terminal can capture forward link energy from as many sources as the number of RAKE fingers in the remote terminal. For example, a three-finger RAKE receiver can capture energy from a maximum of three sectors or multi-paths. This energy can come from multipath in a scattering environment, from multiple sectors in a single base station, and/or from multiple base stations. Once the remote terminal has assigned all of its RAKE fingers to the strongest paths, any additional energy received from other paths acts as interference. Therefore, if the remote terminal is receiving energy from excess sectors and/or reflected paths, the forward link performance can be degraded. Higher orders of sectorization can adversely affect forward link performance by increasing tile chances of interference from additional signal paths. For example, in the sectorization scheme of FIG. 3, there are locations (i.e., some of the intersections of three cell sites) that will receive up to 6 different pilot channels, not even counting any multipath. Since a three-finger RAKE receiver can receive only up to three pilot channels, the other three pilot channels (in addition to any multipath) will contribute to the level of interference.

As to hand-off processing, the process of conducting soft hand-offs between base stations and softer hand-offs between sectors of a base station is a complicated series of events involving the mobile switching center (MSC) and the remote terminal. Higher orders of sectorization will only increase that complexity.

The present invention addresses problems of using sectorization in a CDMA system. These problems relate one or more of cell site capacity, pilot pollution, and hand-off processing.

Further aspects and advantages of this invention will become apparent from the detailed description which follows.

SUMMARY OF THE INVENTION

Embodiments of the present invention are related to communications between a base station and a remote terminal of a CDMA-based communications network. According to the present invention, communications occur via (a) a first subset of CDMA channels at a first sectorization level of a cell-site sectorization scheme and (b) a second subset of the CDMA channels, different from the first subset, at a second sectorization level of the cell-site sectorization scheme, different from the first sectorization level.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Embodiments of the present invention are directed to sectorization schemes for the cell sites in code division multiple access communications networks, such as network 100 of FIG. 1b. In one embodiment, tile pilot and sync channels of an IS-95 CDMA network are transmitted from base stations to remote terminals (e.g., mobile/cellular telephones) in an omnidirectional fashion with one pseudo noise offset applied to the cell site of each base station. At the same time, the cell sites are sectorized for the paging and access channels and the forward and reverse link traffic channels. In another embodiment, sectorization is applied to the cell sites for all channels, but at least two different orders (i.e., levels or degrees) of sectorization. Furthermore, the phasing of the sectorization scheme for adjacent cell sites may be configured to reduce the maximum number of pilot channels (having significant signal strength) that nay be present at any particular location within the network coverage area.

In general, embodiments of the present invention are directed to a sectorization scheme in which different degrees of sectorization are applied to each cell site for different types of channels. In particular implementations, higher orders of sectorization are used for the traffic, paging, and access channels, while wider beams (i.e., lower orders of sectorization) are used to transmit the pilot and sync channels. That is, each cell site is sectorized into one or more sectors for tile pilot and sync channels, and each of those sectors is then further sectorized into two or more subsectors for the traffic, paging, and access channels. In this way, traffic data can receive certain benefits of sectorization (e.g., increased capacity) without adding additional interference at the remote terminal due to pilot pollution.

Within in each cell site, each sector transmits using a different PN offset so that the remote terminal can measure and report the sector(s) that it sees. The decision to transmit and receive traffic channel information in a particular sector is based in part on the remote terminal's measurement of that sector's pilot energy. Since the subsectors share a sector's pilot and PN offset, the remote terminal cannot assist in the subsector selection.

The task of selecting the best subsector falls on the base station. The base station channel element processor scans all the available reverse link traffic subsectors (i.e., antenna faces) with the searchers. The strongest paths are assigned to RAKE fingers. Knowing the reverse link finger energy from each subsector antenna face, one or more forward link traffic subsectors can be selected. The remote terminal continues to participate in sector-to-sector and cell-to-cell hand-offs, but decisions on the subsector level are transparent to the remote terminal.

Figure 4A:
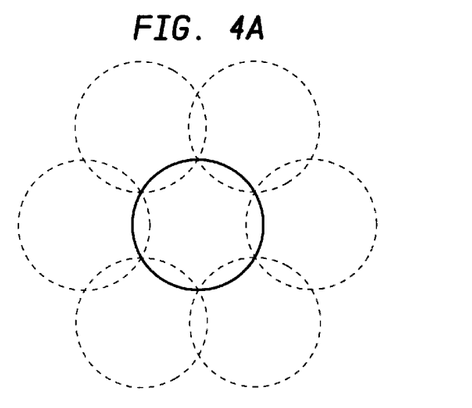
FIGS. 4a–b, 5a–b, 6a–b, and 7a–b show representations of different sectorization schemes for the cell sites of the base stations of the network of FIG. 1b, according to different embodiments of the present invention.
Figure 4B:
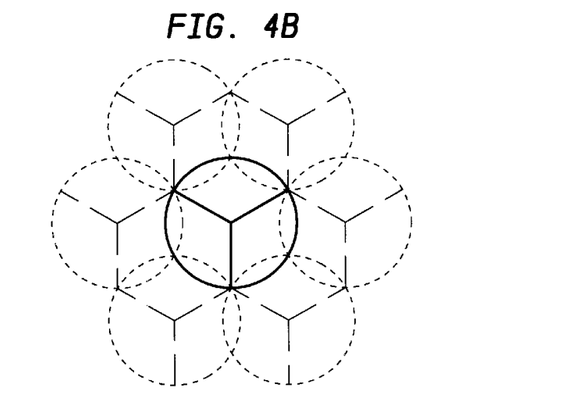

FIGS. 4a–b show representations of a sectorization scheme for the cell sites 108 of base stations 102 of network 100 of FIG. 1b, according to one embodiment of the present invention. As shown in FIG. 4a, each cell site is treated as an omnidirectional (i.e., non-sectorized) cell for the pilot and sync channels transmitted from the base station to the remote terminal, while FIG. 4b shows that each cell site is sectorized into three 120-degree sectors for the forward link traffic and paging channels transmitted from the base station to the remote terminal and for the reverse link traffic and access channels received by the base station from the remote terminal.

In this sectorization scheme, each cell site is assigned one PN offset and Supports one pilot. As shown in FIG. 4a, the maximum number of pilot channels present at any one location is three. As such, this sectorization scheme can be used with existing remote terminals having three-finger RAKE receivers. Nevertheless, the use of a higher degree of sectorization for the traffic, paging, and access channels reduces interference and therefore enables each base station to support an increased number of remote terminals at any one time.

Figure 5A:
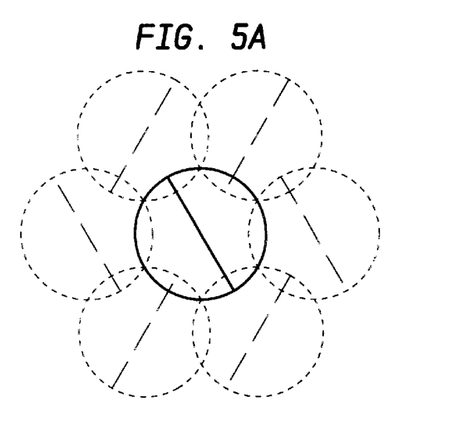
Figure 5B:
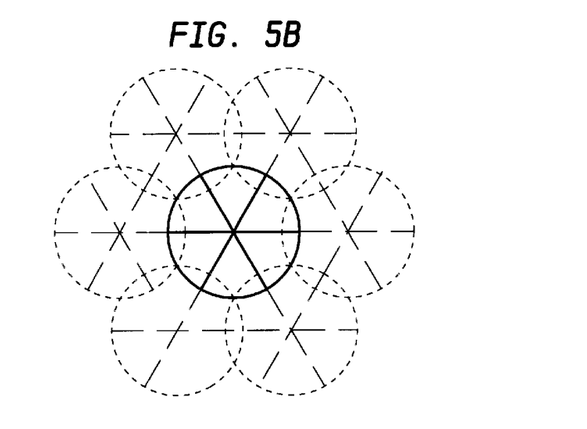

FIGS. 5a–b show representations of a sectorization scheme for the cell sites 108 of base stations 102 of network 100 of FIG. 1b, according to an alternative embodiment of the present invention. As shown in FIG. 5a, each cell site is sectorized into two 180-degree sectors for the pilot and sync channels, while FIG. 5b shows that each sector is further sectorized into three 60-degree subsectors for the traffic, paging, and access channels. In this sectorization scheme, each of the two sectors of each cell site is assigned a different PN offset and transmits a different pilot channel.

In the sectorization scheme of FIG. 5a, the phasing of sectorization of the different cell sites is carefully selected. For example, in the top and bottom rows, the phasing of sectorization is +30 degrees from vertical (where positive is clockwise), while, in the middle row, the phasing of sectorization is –30 degrees from vertical. This phasing pattern keeps the maximum number of pilot channels that may be present at any one location of the network coverage area to three. That is, there are no locations in FIG. 5a where four or more sectors intersect.

As with the sectorization scheme of FIGS. 4a–b, the higher order of sectorization of FIG. 5b (as compared to FIG. 5a) increases the channel capacity for each cell site. Moreover, since each cell site has two different PN offsets (one for each sector), the theoretical limit to the number of remote terminals that can be simultaneously supported by a given base station is double that of FIGS. 4a–b.

Figure 6A:
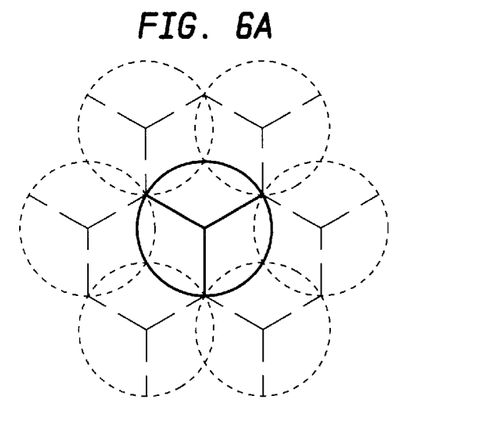
Figure 6B:
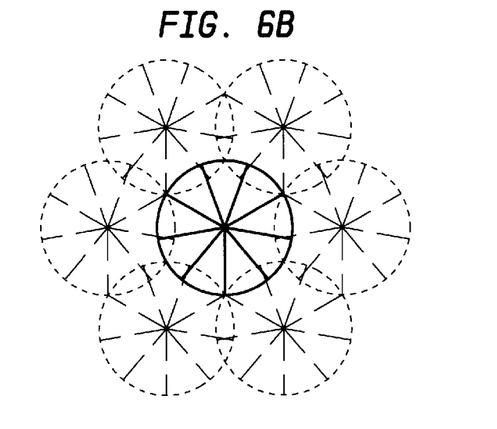

FIGS. 6a–b show representations of a sectorization scheme for tile cell sites 108 of base stations 102 of network 100 of FIG. 1b, according to yet another alternative embodiment of the present invention. As shown in FIG. 6a, each cell site is sectorized into three 120-degree sectors for the pilot and sync channels, while FIG. 6b shows that each sector is further sectorized into three 40-degree subsectors for the traffic, paging, and access channels. In this sectorization scheme, each of the three sectors of each cell site is assigned a different PN offset and transmits a different pilot channel. The sectorization scheme of FIG. 6a is similar to that shown in FIG. 3, which corresponds to existing telecommunications networks. As such, the existing base stations of such networks can be modified to provide the sectorization scheme of FIGS. 6a–b.

As with the sectorization schemes of FIGS. 4a–b and 5a–b, the higher order of sectorization of FIG. 6b (as compared to FIG. 6a) increases the channel capacity for each cell site. Moreover, since each cell site has three different PN offsets (one for each sector), the theoretical limit to the number of remote terminals that can be simultaneously supported by a given base station is triple that of FIGS. 4a–b.

Figure 7A:
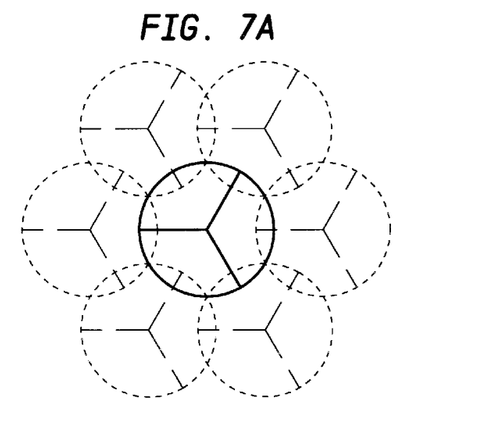
Figure 7B:
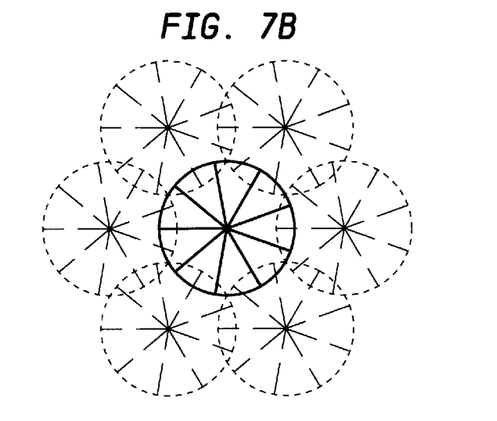

FIGS. 7a–b show representations of a sectorization scheme for the cell sites 108 of base stations 102 of network 100 of FIG. 1b, according to still another alternative embodiment of the present invention. As was the case in FIG. 6a, in FIG. 7a, each cell site is sectorized into three 120-degree sectors for the pilot and sync channels, while FIG. 7b shows that each sector is further sectorized into three 40-degree subsectors for the traffic, paging, and access channels. As in the scheme of FIGS. 6a–b, each of the three sectors of each cell site shown in FIG. 7a is assigned a different PN offset and transmits a different pilot channel.

One difference between the sectorization scheme of FIGS. 7a–b from that of FIGS. 6a–b is that the phasing of the lower degree of sectorization (i.e., FIG. 7a) is selected to reduce the maximum number of pilot channels that are available in any one location of the coverage pattern. That is, for any location within the coverage pattern of FIG. 7a, the maximum number of pilot channels that may be present is three. This is not true for the sectorization scheme of FIGS. 6a–b, where some locations (i.e., some of the intersections of three cell sites) may receive signals from up to six different pilot channels. As such, the sectorization scheme of FIGS. 7a–b can be used with existing mobile telephones having three-finger RAKE receivers.

Although in the particular examples of FIGS. 6a–b and 7a–b, the maximum number of pilot channels that may be present in any one location is reduced from six to three, the effect of phasing, according to the present invention, may be defined more generally as a reduction in the average expected number of pilot channels over tile network. This value takes into account integrating over the entire network coverage area as well as the most likely distribution of users within the network. This means that phasing according to the present invention operates to reduce the overall chances that remote terminals will receive more than three pilot channels. Nevertheless, there may still be locations within the network where more than three pilot channels are present.

The value 3 as tile goal for pilot channel reduction is based on tile existing three-finger RAKE receiver technology. Other goals—and therefore other sectorization and phasing schemes—will apply for systems based on other receiver technology, e.g., receivers having more or fewer antenna fingers.

In general, for the present embodiments, there is one PN offset and one pilot channel for each sector in the sectorization scheme applied to the cell site for the pilot and sync channels. The PN offsets, therefore, can be used to identify the sectors and base stations in the network and provide a mechanism for a remote terminal to determine the source of the forward link energy. In addition, the remote terminal can decode the PN offsets of all signals that it receives and report the signal strength of all pilots (PN offsets) back through the base station(s) to the MSC. This data can then be used to decide when to hand-off between sectors and base stations.

A goal of the channel element firmware algorithm is to determine at least one optimal subsector for the forward link traffic channel of each remote terminal. The decision may be primarily based on the reverse link traffic antenna selections, reverse link signal strength, and/or quality (e.g., bit error rate, frame error rate, duration or length of time that the signal is present). Secondary factors may include the weighting factors determined by environment (e.g., urban, suburban, rural, etc.) and statistical data analysis of historical traffic patterns in the cell. The base station may execute the algorithm in a way that is transparent to the remote terminals and to the MSC.

The present invention provides certain network and base station improvements over the prior art. For example, the present invention may be implemented to address the pilot pollution problem by reducing the number of unique pilot PN offsets in a network while still providing equal or greater capacity (i.e., total number of remote terminals in use).

The present invention also simplifies hand-offs involving the MSC. In the prior art, soft and softer hand-offs allow a remote terminal to move from sector to sector and from cell to cell throughout a network of cell sites without traffic channel interruptions. This is accomplished by assigning each sector a pilot PN offset that is different from the neighboring sectors so that, as the remote terminal passes through the network, it is able to measure and report pilot information back to the MSC. The MSC then uses the pilot information, combined with its own record of all of the sectors and pilot PN offsets in its network, to hand off the remote terminal as it passes between tile reported sectors.

According to the present invention, a pilot PN offset is shared among two or more sectors (or subsectors, depending on the scheme) of a cell site and hand-offs among these sectors is controlled by the base station instead of the MSC. For example, a prior art network of three-sector cell sites uses three pilot PN offsets per base station (one per sector), but, according to embodiments of the present invention, the three sectors may share a single pilot PN offset (as in FIG. 4a) and appear to tile MSC and remote terminals as an omnidirectional cell site. In such a network, the frequency of hand-offs involving the MSC is reduced since only inter-cell (soft) hand-offs are controlled by the MSC. Furthermore, intra-cell (softer) hand-offs can be performed more quickly by tile base station since the remote terminal and MSC are not involved.

In addition, the present invention enables a simplification of cell site engineering by reducing the potential for pilot pollution (areas where too many pilots overlap). A large part of cell site engineering involves adjusting network parameters for each cell site by testing all combinations of hand-offs between a cell site and its immediate neighbors (cell cluster) and verifying inter-cell coverage. Pilot pollution, if it occurs, is likely to appear in the cell overlap zones and will seriously impair cluster testing efforts.

The present invention increases capacity and coverage by supporting higher orders of sectorization without increasing interference by making more efficient use of the 64 available Walsh functions per pilot PN offset and thereby reducing two disadvantages associated with increased sectorization: pilot pollution and hand-off speed.

In general, the ratio of sectorization between groups of channels, according to the present invention, is a variable. For example, the ratio of sectorization between traffic/access/paging channels and pilot/sync channels may be 2:1 or 3:1. Higher ratios are also possible. There is also flexibility in the implementation of how the channels are grouped for sectorization. For example, the paging and access channels each can have the same degree of sectorization as the pilot and sync channels or as the traffic channels. It may also be possible to have subsets of the same type of channel at different sectorization levels. For example, wider beams (i.e., lower sectorization levels) may be used for the traffic channels of very mobile users who frequently cross sub-sector boundaries, while narrower beams (i.e., higher sectorization levels) may be used for relatively static users. In general, the present invention covers different ratios of sectorization order as well as different schemes of channel grouping for sectorization.

The sectorization schemes of FIGS. 4a–7b are based on two levels of sectorization. The present invention may be generalized to two or more levels of sectorization, if appropriate, with different channels grouped accordingly.

Furthermore, sectorization may be, but need not be, uniform, either within a cell site or between cell sites. In particular, within a cell site, the sectors (or subsectors) for a (given order of sectorization may be, but do not have to be, the same size. For example, a cell site sectorized at an order of three, may be divided into three equal 120-degree sectors or three unequal sectors (e.g., 100, 100, and 160 degrees), depending on the requirements presented by, e.g., the physical topography and/or expected distribution of users within the cell site. In addition, different sectors within a cell site may be divided into different numbers of subsectors. For example, one 180-degree sector may be further sectorized into three 60-degree subsectors, while the other 180-degree sector of the same cell site is further sectorized into only two 90-degree subsectors.

As for uniformity between cell sites, the sectorization scheme can vary from cell site to cell site. For example, one or more cell sites in the network may sectorized based on the sectorization scheme of FIGS. 4a–b, while one or more other cell sites are sectorized based on the sectorization scheme of FIGS. 5a–b, and so forth.

The present invention may be applied to communications networks other than network 100 of FIG. 1b. For example, some or all of the base stations may be satellite-based rather than ground-based. In that case, each satellite-based base station may have an antenna array corresponding to a plurality of cell sites. The present invention may also be implemented in networks having topographies based on other than the MSC-base station paradigm.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. During non-handoff operations, a method for communicating between a base station and an individual remote terminal of a CDMA-based communications network, comprising the steps of:

(a) communicating between the base station and the individual remote terminal via a first subset of types of CDMA channels at a first sectorization level of a cell-site sectorization scheme; and (b) simultaneously communicating between the base station and the individual remote terminal via a second subset of types of CDMA channels, different from the first subset, at a second sectorization level of the cell-site sectorization scheme, having a degree of sectorization different from the degree of sectorization of the first sectorization level, wherein:

a cell corresponding to the base station is simultaneously sectorized at (1) the first sectorization level for communications between the base station and the individual remote terminal using the first subset of types of CDMA channels and (2) the second sectorization level for communications between the base station and the individual remote terminal using the second subset of types of CDMA channels;

the types of CDMA channels comprise one or more of pilot, sync, paging, and forward link traffic channels transmitted from the base station to the remote terminal, and one or more of access and reverse link traffic channels transmitted from the remote terminal to the base station;

the first subset comprises one or more of the pilot and sync channels; and the second subset comprises one or more of the access, paging, forward link traffic, and reverse link traffic channels.

2. The method of claim 1, wherein the phasing of sectorization at the first sectorization level is selected to reduce the average expected number of pilot channels within the network.

3. The method of claim 1, wherein the first sectorization level has a lower degree of sectorization than the second sectorization level.

4. The method of claim 3, wherein:

at the first sectorization level, the cell site is omnidirectional;

at the second sectorization level, the cell site is sectorized into two or more sectors; and one PN offset is assigned to the cell site; and the cell site transmits signals corresponding to one pilot channel.

5. The method of claim 3, wherein:

at the first sectorization level, the cell site is sectorized into two or more sectors;

at the second sectorization level, each sector is further sectorized into two or more sub-sectors;

one PN offset is assigned to each sector;

each sector transmits signals corresponding to one pilot channel; and the phasing of sectorization at the first sectorization level is selected to reduce the average expected number of pilot channels within the network.

6. A base station of a CDMA-based communications network for communicating with an individual remote terminal during non-handoff operations, wherein:

the base station is adapted to communicate with the remote terminal via a first subset of types of CDMA channels at a first sectorization level of a cell-site sectorization scheme; and the base station is adapted to simultaneously communicate with the remote terminal via a second subset of types of CDMA channels, different from the first subset, at a second sectorization level of the cell-site sectorization scheme, having a degree of sectorization different from the degree of sectorization of the first sectorization level, wherein:

a cell corresponding to the base station is simultaneously sectorized at (1) the first sectorization level for communications between the base station and the individual remote terminal using the first subset of types of CDMA channels and (2) the second sectorization level for communications between the base station and the individual remote terminal using the second subset of types of CDMA channels;

the types of CDMA channels comprise one or more of pilot, sync, paging, and forward link traffic channels transmitted from the base station to the remote terminal, and one or more of access and reverse link traffic channels transmitted from the remote terminal to the base station;

the first subset comprises one or more of the pilot and sync channels; and the second subset comprises one or more of the access, paging, forward link traffic, and reverse link traffic channels.

7. The base station of claim 6, wherein the phasing of sectorization at the first sectorization level is selected to reduce the average expected number of pilot channels within the network.

8. The base station of claim 6, wherein the first sectorization level has a lower degree of sectorization than the second sectorization level.

9. The base station of claim 8, wherein:

at the first sectorization level, the cell site is omnidirectional;

at the second sectorization level, the cell site is sectorized into two or more sectors; and one PN offset is assigned to the cell site; and the cell site transmits signals corresponding to one pilot channel.

10. The base station of claim 8, wherein:

at the first sectorization level, the cell site is sectorized into two or more sectors;

at the second sectorization level, each sector is further sectorized into two or more sub-sectors;

one PN offset is assigned to each sector;

each sector transmits signals corresponding to one pilot channel; and the phasing of sectorization at the first sectorization level is selected to reduce the average expected number of pilot channels within the network.

11. A remote terminal for communicating with a base station of a CDMA-based communications network during non-handoff operations, wherein:

the remote terminal is adapted to communicate with the base station via a first subset of types of CDMA channels at a first sectorization level of a cell-site sectorization scheme; and the remote terminal is adapted to simultaneously communicate with the base station via a second subset of types of CDMA channels, different from the first subset, at a second sectorization level of the cell-site sectorization scheme, having a degree of sectorization different from the degree of sectorization of the first sectorization level, wherein:

a cell corresponding to the base station is simultaneously sectorized at (1) the first sectorization level for communications between the base station and the remote terminal using the first subset of types of CDMA channels and (2) the second sectorization level for communications between the base station and the remote terminal using the second subset of types of CDMA channels;

the types of CDMA channels comprise one or more of pilot, sync, paging, and forward link traffic channels transmitted from the base station to the remote terminal, and one or more of access and reverse link traffic channels transmitted from the remote terminal to the base station;

the first subset comprises one or more of the pilot and sync channels; and the second subset comprises one or more of the access, paging, forward link traffic, and reverse link traffic channels.

12. The remote terminal of claim 11, wherein the phasing of sectorization at the first sectorization level is selected to reduce the average expected number of pilot channels within the network.

13. The remote terminal of claim 11, wherein the first sectorization level has a lower degree of sectorization than the second sectorization level.

14. The remote terminal of claim 13, wherein:

at the first sectorization level, the cell site is omnidirectional;

at the second sectorization level, the cell site is sectorized into two or more sectors; and one PN offset is assigned to the cell site; and the cell site transmits signals corresponding to one pilot channel.

15. The remote terminal of claim 13, wherein:

at the first sectorization level, the cell site is sectorized into two or more sectors;

at the second sectorization level, each sector is further sectorized into two or more sub-sectors;

one PN offset is assigned to each sector;

each sector transmits signals corresponding to one pilot channel; and the phasing of sectorization at the first sectorization level is selected to reduce the average expected number of pilot channels within the network.

16. A method for communicating between a base station and an individual remote terminal of a CDMA-based communications network, comprising the steps of:

(a) communicating between the base station and the individual remote terminal via a first subset of types of CDMA channels at a first sectorization level of a cell-site sectorization scheme; and (b) simultaneously communicating between the base station and the individual remote terminal via a second subset of types of CDMA channels, different from the first subset, at a second sectorization level of the cell-site sectorization scheme, having a degree of sectorization different from the degree of sectorization of the first sectorization level, wherein:

a cell corresponding to the base station is simultaneously sectorized at (1) the first sectorization level for communications between the base station and the individual remote terminal using the first subset of types of CDMA channels and (2) the second sectorization level for communications between the base station and the individual remote terminal using the second subset of types of CDMA channels;

the types of CDMA channels comprise one or more of pilot, sync, paging, and forward link traffic channels transmitted from the base station to the remote terminal, and one or more of access and reverse link traffic channels transmitted from the remote terminal to the base station;

the first subset comprises one or more of the pilot and sync channels;

the second subset comprises one or more of the access, paging, forward link traffic, and reverse link traffic channels, no traffic channels correspond to the first sectorization level; and no pilot and sync channels correspond to the second sectorization level.

17. The method of claim 16, wherein the phasing of sectorization at the first sectorization level is selected to reduce the average expected number of pilot channels within the network.

18. The method of claim 16, wherein the first sectorization level has a lower degree of sectorization than the second sectorization level.

19. The method of claim 18, wherein:

at the first sectorization level, the cell site is omnidirectional;

at the second sectorization level, the cell site is sectorized into two or more sectors; and one PN offset is assigned to the cell site; and the cell site transmits signals corresponding to one pilot channel.

20. The method of claim 18, wherein:

at the first sectorization level, the cell site is sectorized into two or more sectors;

at the second sectorization level, each sector is further sectorized into two or more sub-sectors;

one PN offset is assigned to each sector;

each sector transmits signals corresponding to one pilot channel; and the phasing of sectorization at the first sectorization level is selected to reduce the average expected number of pilot channels within the network.

21. A base station of a CDMA-based communications network for communicating with an individual remote terminal, wherein:

the base station is adapted to communicate with the remote terminal via a first subset of types of CDMA channels at a first sectorization level of a cell-site sectorization scheme; and the base station is adapted to simultaneously communicate with the remote terminal via a second subset of types of CDMA channels, different from the first subset, at a second sectorization level of the cell-site sectorization scheme, having a degree of sectorization different from the degree of sectorization of the first sectorization level, wherein:

a cell corresponding to the base station is simultaneously sectorized at (1) the first sectorization level for communications between the base station and the individual remote terminal using the first subset of types of CDMA channels and (2) the second sectorization level for communications between the base station and the individual remote terminal using the second subset of types of CDMA channels;

the types of CDMA channels comprise one or more of pilot, sync, paging, and forward link traffic channels transmitted from the base station to the remote terminal, and one or more of access and reverse link traffic channels transmitted from the remote terminal to the base station;

the first subset comprises one or more of the pilot and sync channels;

the second subset comprises one or more of the access, paging, forward link traffic, and reverse link traffic channels;

no traffic channels correspond to the first sectorization level; and no pilot and sync channels correspond to the second sectorization level.

22. The base station of claims 21, wherein the phasing of sectorization at the first sectorization level is selected to reduce the average expected number of pilot channels within the network.

23. The base station of claim 21, wherein the first sectorization level has a lower degree of sectorization than the second sectorization level.

24. The base station of claim 23, wherein:

at the first sectorization level, the cell site is omnidirectional;

at the second sectorization level, the cell site is sectorized into two or more sectors; and one PN offset is assigned to the cell site; and the cell site transmits signals corresponding to one pilot channel.

25. The base station of claim 23, wherein:

at the first sectorization level, the cell site is sectorized into two or more sectors;

at the second sectorization level, each sector is further sectorized into two or more subsectors;

one PN offset is assigned to each sector;

each sector transmits signals corresponding to one pilot channel; and the phasing of sectorization at the first sectorization level is selected to reduce the average expected number of pilot channels within the network.

26. A remote terminal for communicating with a base station of a CDMA-based communications network, wherein:

the remote terminal is adapted to communicate with the base station via a first subset of types of CDMA channels at a first sectorization level of a cell-site sectorization scheme; and the remote terminal is adapted to simultaneously communicate with the base station via a second subset of types of CDMA channels, different from the first subset, at a second sectorization level of the cell-site sectorization scheme, having a degree of sectorization different from the degree of sectorization of the first sectorization level, wherein:

a cell corresponding to the base station is simultaneously sectorized at (1) the first sectorization level for communications between the base station and the remote terminal using the first subset of types of CDMA channels and (2) the second sectorization level for communications between the base station and the remote terminal using the second subset of types of CDMA channels;

the types of CDMA channels comprise one or more of pilot, sync, paging, and forward link traffic channels transmitted from the base station to the remote terminal, and one or more of access and reverse link traffic channels transmitted from the remote terminal to the base station;

the first subset comprises one or more of the pilot and sync channels;

the second subset comprises one or more of the access, paging, forward link traffic, and reverse link traffic channels;

no traffic channels correspond to the first sectorization level; and no pilot and sync channels correspond to the second sectorization level.

27. The remote terminal of claim 26, wherein the phasing of sectorization at the first sectorization level is selected to reduce the average expected number of pilot channels within the network.

28. The remote terminal of claim 26, wherein the first sectorization level has a lower degree of sectorization than the second sectorization level.

29. The remote terminal of claim 28, wherein:

at the first sectorization level, the cell site is omnidirectional;

at the second sectorization level, the cell site is sectorized into two or more sectors; and one PN offset is assigned to the cell site; and the cell site transmits signals corresponding to one pilot channel.

30. The remote terminal of claim 28, wherein:

at the first sectorization level, the cell site is sectorized into two or more sectors;

at the second sectorization level, each sector is further sectorized into two or more sub-sectors;

one PN offset is assigned to each sector;

each sector transmits signals corresponding to one pilot channel; and the phasing of sectorization at the first sectorization level is selected to reduce the average expected number of pilot channels within the network.

* * * * *